United States Patent
Gicquel et al.

(10) Patent No.: US 9,263,222 B2
(45) Date of Patent: Feb. 16, 2016

(54) TARGET EXTENDER IN RADIATION GENERATOR

(71) Applicant: Schlumberger Technology Corporation, Sugar Land, TX (US)

(72) Inventors: Frederic Gicquel, Pennington, NJ (US); Kenneth E. Stephenson, Plainsboro, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 37 days.

(21) Appl. No.: 14/344,619

(22) PCT Filed: Sep. 16, 2012

(86) PCT No.: PCT/US2012/055675
§ 371 (c)(1),
(2) Date: Mar. 13, 2014

(87) PCT Pub. No.: WO2013/040525
PCT Pub. Date: Mar. 21, 2013

(65) Prior Publication Data
US 2014/0346338 A1 Nov. 27, 2014

Related U.S. Application Data

(60) Provisional application No. 61/535,184, filed on Sep. 15, 2011.

(51) Int. Cl.
*G01V 5/08* (2006.01)
*H01J 27/02* (2006.01)
*H05H 3/06* (2006.01)
(Continued)

(52) U.S. Cl.
CPC .................. *H01J 27/022* (2013.01); *G01V 5/10* (2013.01); *G01V 5/12* (2013.01); *H01J 9/02* (2013.01); *H05H 3/06* (2013.01); *H05H 6/00* (2013.01);
(Continued)

(58) Field of Classification Search
CPC ............ G01V 5/101; G01V 5/08; G01V 5/10
See application file for complete search history.

(56) References Cited

U.S. PATENT DOCUMENTS 2,831,134 A 4/1958 Reifenschweiler
3,151,243 A * 9/1964 Mott ........................ G01V 5/08
 250/253

(Continued)

OTHER PUBLICATIONS

International Search Report for International Application No. PCT/US2012/055675 dated Jan. 24, 2013.

*Primary Examiner* — Christine Sung
(74) *Attorney, Agent, or Firm* — Michael Dae

(57) ABSTRACT

A radiation generator may include a generator housing, a target electrode carried by the generator housing, a charged particle source carried by the generator housing to direct charged particles at the target electrode based upon an accelerating potential, and a suppressor electrode carried by the generator housing having an opening therein to permit passage of charged particles to the target electrode. A target extender electrode may be between the suppressor electrode and the target electrode and have an opening therein to permit passage of charged particles to the target. At least one voltage source may be coupled to the target electrode, the suppressor electrode, and the target extender electrode to cause the target electrode to have a voltage greater than a voltage of the suppressor electrode and to cause the target extender electrode to have a voltage greater than the voltage of the suppressor electrode.

17 Claims, 7 Drawing Sheets

(51) Int. Cl.
  *H05H 6/00* (2006.01)
  *G01V 5/12* (2006.01)
  *H01J 9/02* (2006.01)
  *G01V 5/10* (2006.01)

(52) U.S. Cl.
  CPC . *G01V 5/08* (2013.01); *G01V 5/101* (2013.01); *Y10T 29/49117* (2015.01)

(56) References Cited

U.S. PATENT DOCUMENTS

| | | | | |
|---|---|---|---|---|
| 3,756,682 A | * | 9/1973 | Frentrop | H05H 3/06 445/40 |
| 4,600,838 A | | 7/1986 | Steinman et al. | |
| 4,721,853 A | | 1/1988 | Wraight | |
| 4,794,792 A | | 1/1989 | Flaum et al. | |
| 5,191,517 A | * | 3/1993 | Stephenson | H05H 5/04 361/329 |
| 5,293,410 A | * | 3/1994 | Chen | H05H 3/06 376/108 |
| 5,313,504 A | | 5/1994 | Czirr | |
| 7,073,378 B2 | | 7/2006 | Smits et al. | |
| 2002/0131543 A1 | * | 9/2002 | Leung | G21B 3/00 376/108 |
| 2004/0022341 A1 | * | 2/2004 | Leung | H05H 3/06 376/144 |
| 2009/0135982 A1 | | 5/2009 | Groves | |
| 2011/0044418 A1 | * | 2/2011 | Stubbers | H05H 3/06 376/116 |
| 2011/0114830 A1 | * | 5/2011 | Reijonen | H01J 35/04 250/251 |
| 2012/0063558 A1 | * | 3/2012 | Reijonen | H01J 35/04 376/108 |
| 2013/0294557 A1 | | 11/2013 | Perkins | |

\* cited by examiner

TARGET EXTENDER IN RADIATION GENERATOR

BACKGROUND

Radiation generators, such as neutron and X-ray generators, are used in well logging tools to take measurements of a geological formation adjacent a wellbore where hydrocarbon resources are located (e.g., oil and/or natural gas). Neutron generators use deuterium-deuterium (d-d), deuterium-tritium (d-t) or tritium-tritium (t-t) reactions to create neutrons without the use of radioactive materials.

Neutron generators may include a neutron tube and associated electrical components, such as one or more high voltage transformers with a Cockcroft-Walton ladder to produce a high operating voltage. The neutron tube is a sealed envelope made of metal and insulators comprising a gas reservoir, an ion source, an accelerator column and a target. The target may be made of a hydride material. Once released from the reservoir, the gas is ionized in the ion source, and then accelerated in the accelerator column toward the target. A nuclear fusion reaction occurs between the incoming ions and the hydrogen isotope atoms present in the target, causing neutrons to be directed into the geological formation. A radiation detector may detect the radiation from the geological formation resulting form the neutron bombardment, which in turn provides information regarding the composition of the geological formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation generator may include a generator housing, a target electrode carried by the generator housing, a charged particle source carried by the generator housing to direct charged particles at the target electrode based upon an accelerating potential, and a suppressor electrode carried by the generator housing having an opening therein to permit passage of charged particles to the target electrode. A target extender electrode may be between the suppressor electrode and the target electrode and have an opening therein to permit passage of charged particles to the target. At least one voltage source may be coupled to the target electrode, the suppressor electrode, and the target extender electrode to cause the target electrode to have a voltage greater than a voltage of the suppressor electrode, and to cause the target extender electrode to have a voltage greater than the voltage of the suppressor electrode.

A well logging tool may include a sonde housing and a radiation generator, such as the one described briefly above, carried by the sonde housing. At least one radiation detector may also be carried by the sonde housing.

A method of making a radiation generator may include positioning a target electrode within a generator housing, positioning a charged particle source within the generator housing to direct charged particles at the target electrode based upon an accelerating potential, positioning a suppressor electrode within the generator housing having an opening therein to permit passage of charged particles to the target electrode, and positioning a target extender electrode between the suppressor electrode and the target electrode. The target extender electrode may have an opening therein to permit passage of charged particles to the target electrode. The method may further include coupling at least one voltage source to the target electrode, the suppressor electrode, and the target extender electrode to cause the target electrode to have a voltage greater than a voltage of the suppressor electrode, and to cause the target extender electrode to have a voltage greater than the voltage of the suppressor electrode.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements in different embodiments.

Figure 1:
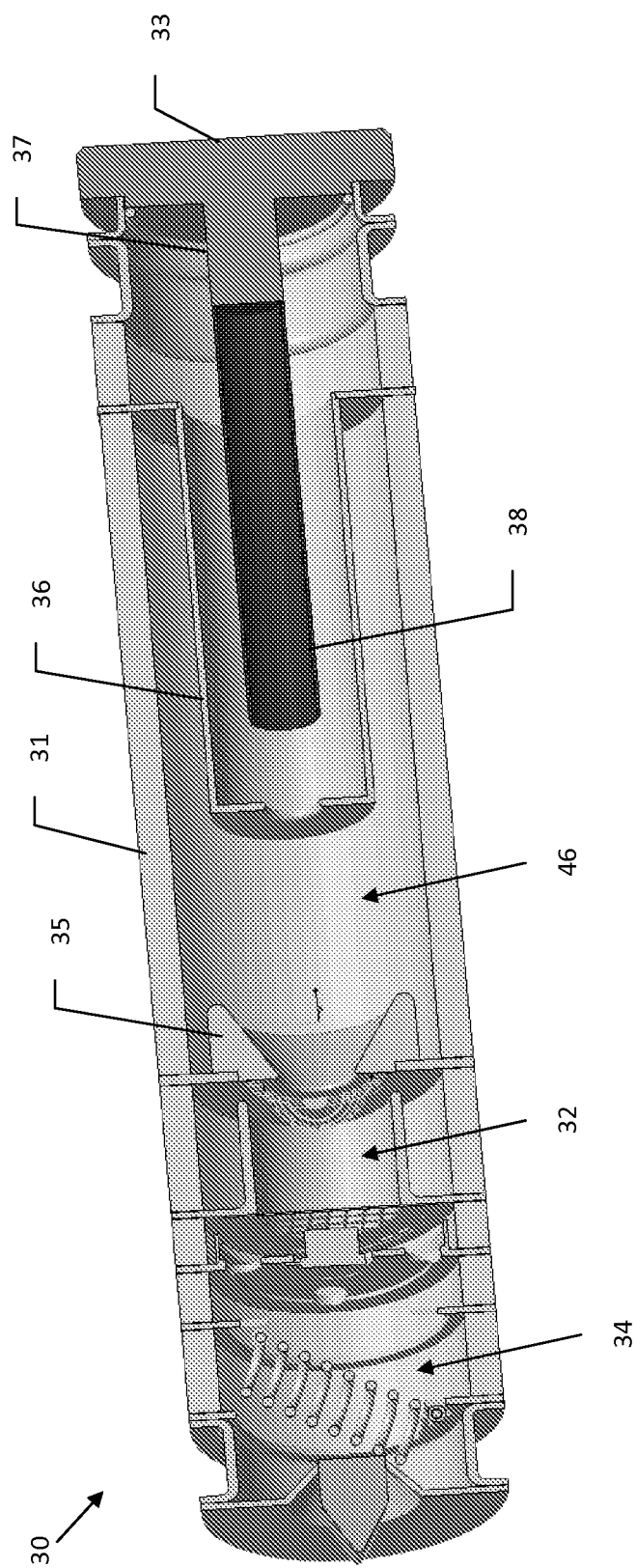
FIG. 1 is a perspective fragmentary view of a radiation generator according to an example embodiment.
Figure 2:
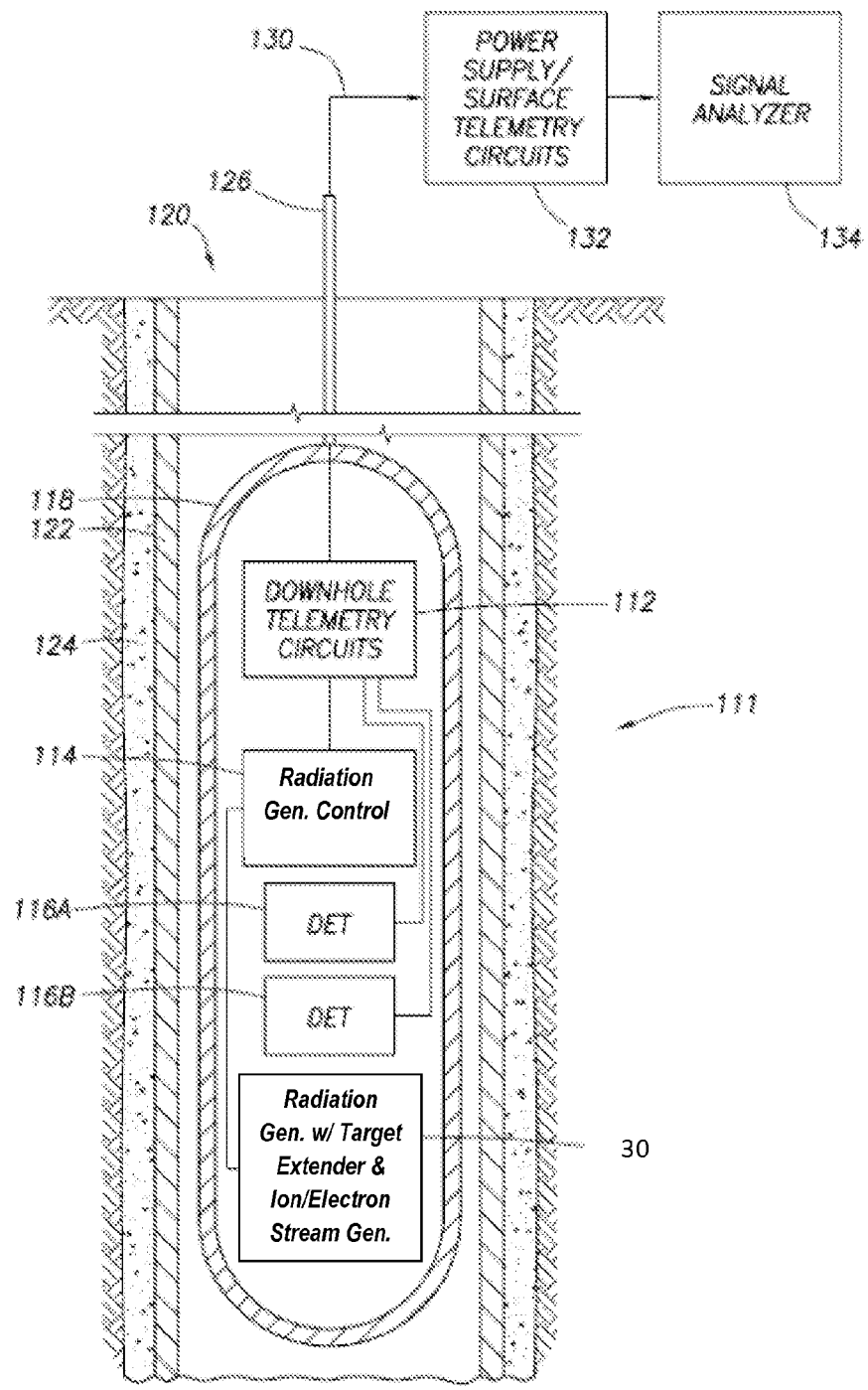
FIG. 2 is a schematic view of an example logging tool in which the radiation generator of FIG. 1 is used.

Referring initially to FIGS. 1 and 2, a radiation generator 30 may be used as part of a logging tool 111, as shown. The radiation generator 30 illustratively includes a generator housing or envelope 31, which may be sealed and have a hollow cylindrical/tubular shape. In the present example, the radiation generator 30 is a neutron generator which illustratively includes a gas reservoir 34 and an ion source 32 disposed at one end of the generator housing 31, and a target electrode 33 disposed at the other (opposite) end of the generator housing. The target electrode 33 has a stem 37 extending toward the ion generator 32. However, in other embodiments the radiation generator 30 may be an X-ray generator with an electron source instead of the ion source 32, for example. An extractor electrode 35 is coupled to the output of the ion source, and an accelerator gap 46 is defined between the ion source 32 and the target electrode 33.

The ion source 32 generates positively charged ions, and the high voltage accelerator gap 46 accelerates the ions toward the target electrode 33. By way of example, the target electrode and/or the stem 37 may have an active target region comprising a metal hydride with deuterium, tritium, or a mixture of the two, although other materials may be used in different configurations. A suppressor electrode 36 shrouds the target electrode 33 and stem 37, and may be provided within a vacuum tight enclosure. The suppressor electrode 36 helps reduce electrons from being extracted from the active target region upon ion bombardment, as will be discussed further below. To do so, a negative voltage potential difference is provided between the suppressor electrode 36 and the target electrode 33 with a magnitude between about 200V and 1000V, for example. A vacuum tight enclosure may also help support the gas reservoir 34, which may include a filament or hydrogen-getter material made of metal hydride, for example. Further details on example radiation generator structures are provided in U.S. Application Ser. No. 61/412,604 entitled "Particle Accelerator with a Heat Pipe Supporting Components of a High Voltage Power Supply", which is commonly assigned with the present disclosure, and incorporated herein by reference in its entirety. One of ordinary skill will appreciate that the polarities of the electrodes may be reversed for different configurations, such as for an x-ray generator, for example.

As will be discussed further below, the requisite high voltage electrical components (e.g., power supply) may also be enclosed within the generator housing 31. Supporting control circuitry 114 for the radiation generator 30 (e.g., low voltage control components) may be located outside of the generator housing 31. For example, the radiation generator 30 may be carried in a sonde housing 118, in which the control circuitry 114 and other components are also located, such as downhole telemetry circuitry 112 and one or more radiation detectors. In the illustrated example, two radiation detectors 116A, 116B are included within the sonde housing 118.

The sonde housing 118 is to be moved through a borehole 120. In the illustrated example, the borehole 120 is lined with a steel casing 122 and a surrounding cement annulus 124, although the sonde housing and radiation generator 30 may be used with other borehole configurations (e.g., open holes). By way of example, the sonde housing 118 may be suspended in the borehole 120 by a cable 126, although a coiled tubing, etc., may also be used. Furthermore, other modes of conveyance of the sonde housing 118 within the borehole 120 may be used, such as wireline, slickline, Tough Logging Conditions (TLC) systems, and logging while drilling (LWD), for example. The sonde housing 118 may also be deployed for extended or permanent monitoring in some applications.

A multi-conductor power supply cable 130 may be carried by the cable 126 to provide electrical power from the surface (from power supply circuitry 132) downhole to the sonde housing 118 and the electrical components therein (i.e., the downhole telemetry circuitry 112, low-voltage radiation generator support circuitry 114, and radiation detectors 116A, 116B). However, in other configurations power may be supplied by batteries and/or a downhole power generator, for example.

The radiation generator 30 is operated to emit neutrons to irradiate the geological formation adjacent the sonde housing 118. Neutrons and/or photons (i.e., gamma rays) that return from the formation are detected by the radiation detectors 116A, 116B. The outputs of the radiation detectors 116A, 116B are communicated to the surface via the downhole telemetry circuitry 112 and the surface telemetry circuitry 132, which may be analyzed by a signal analyzer 134 to obtain information regarding the geological formation. By way of example, the signal analyzer 134 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 118 in some embodiments. The radiation generator 30 may also be used in conjunction with other devices, including, for example, logging tools such as those described in U.S. Pat. Nos. 4,794,792; 4,721,853; 4,600,838; 5,313,504; and 7,073,378, which are hereby incorporated herein in their entireties by reference.

By way of background, when ions impinge on a solid material like the target electrode 33, secondary electrons are created, which can be accelerated back to the ion source. In this regard, a suppressor electrode 36 may be coupled between the target electrode 33 and the ion source 32 to apply a suppressing electric or electromagnetic (EM) field adjacent the target electrode to "push" the secondary electrons back toward the target electrode.

Figure 7:
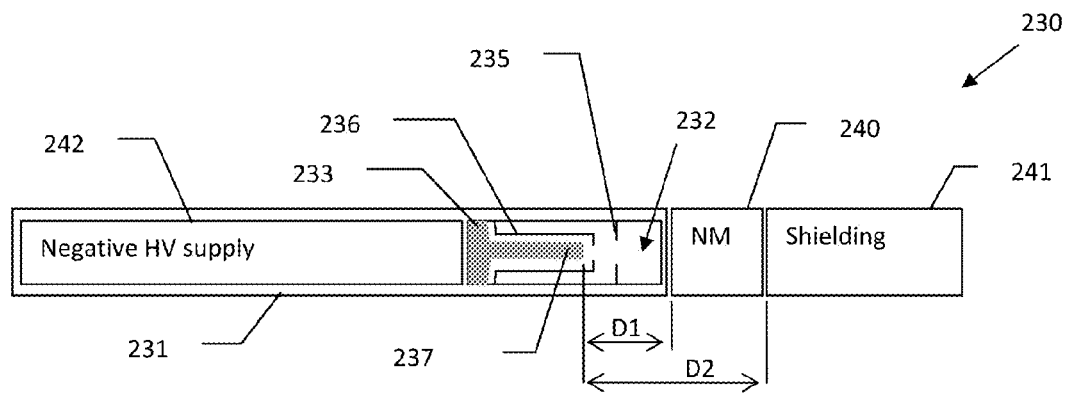
FIG. 7 is a schematic cross-sectional diagram of a conventional radiation generator configuration.

Because the generator housing 31 is sealed, the pressure is substantially the same throughout the generator housing. As such, wherever there are ions, there will be unwanted secondary reactions such as recombination, scattering, ionization, etc. To reduce these secondary reactions, the path traveled by the ions in the neutron tube is reduced as much as possible. A conventional neutron generator 230 is shown in FIG. 7, which illustratively includes a generator housing 231, an ion source 232 and associated extractor electrode 235, a suppressor electrode 236, a target electrode 233 with stem 237, and a negative high voltage (HV) supply 242. With this configuration, to hold the voltage in various configurations, HV voltage insulators which make up part of the vacuum envelope may be relatively long. This means that a suppressor electrode 236 and a target electrode 233 will be reentrant, with the active portion of the target being at the end of the stem 237 and extending well inside the tubular suppressor electrode toward the ion generator 232.

Such a configuration has various drawbacks. First, although the target electrode 233 and stem 237 may be made of copper, the temperature drop along the stem can be relatively large when the generator is run at high power. The active surface of the target electrode 233 of the stem 237 may therefore reach relatively high temperatures, which may be detrimental to efficiency. Second, if the tool design calls for a neutron monitor (NM) 240 to be placed at a given distance D1 from the target, as a result of the extended length of the stem 237, the distance between the neutron monitor and the active region of the target electrode 233 may be such that the neutron measurement may be negatively affected because the signal to noise ratio increases. Moreover, this may similarly affect a distance D2 from the target to near gamma shielding 241, which may in turn also affect the quality of the measurement by the radiation detectors 116A, 116B if this distance becomes too great.

In contrast to such prior configurations, the radiation generator 30 illustratively includes a target extender electrode 38 positioned between the suppressor electrode 36 and the target electrode 33, and having an opening therein to permit passage of charged particles to the target electrode. This configuration allows for relatively short stem 37 lengths (or no stem, as shown in the example embodiment of FIG. 3), while still providing appropriate suppression fields adjacent the target to re-direct secondary electrons back toward the target electrode 33. By way of example, the target extender electrode 38 may comprise a conductive material, such as copper, etc.

Figure 3:
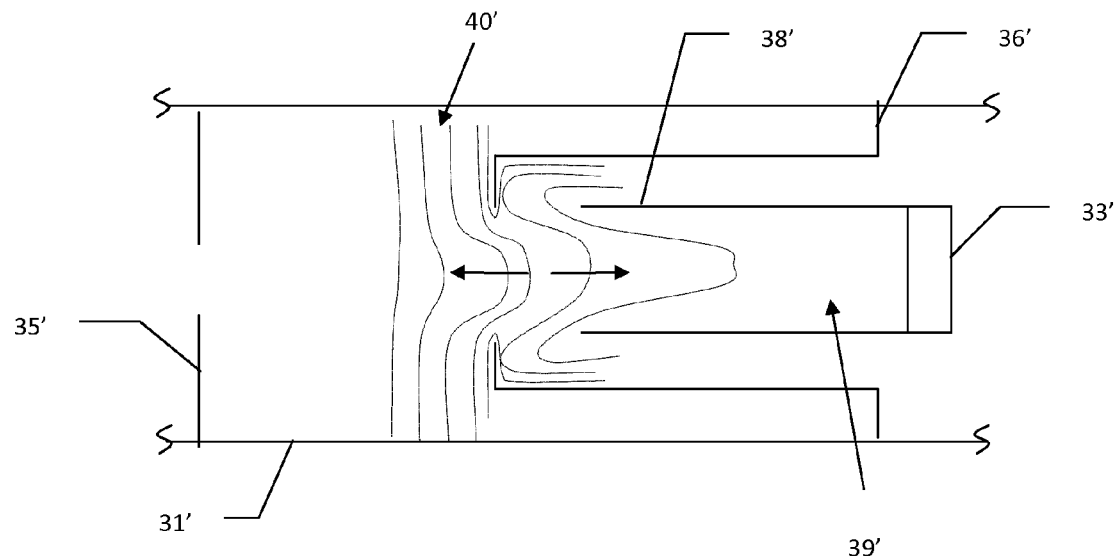
FIG. 3 is a schematic cross-sectional diagram of the radiation generator of FIG. 1 illustrating field regions caused by the suppressor electrode and target extender electrode thereof.

In the example of FIG. 3, the target extender electrode 38' creates a region 39' directly in front of the target electrode 33' where little or no suppressing or suppression field 40' is present. The region 39' is at or near the voltage of the target electrode 33' to thereby take advantage of the suppressing field. At this point, the high energy ions have their final energy, and the most probable secondary reactions will be charge exchanges with little or no loss of energy. There is a relatively low probability of nucleus-to-nucleus interaction which would result in a transfer of energy, and thus the particles will still impinge on the active target region with full (or substantially full) energy, as will be appreciated by those skilled in the art.

Figure 4:
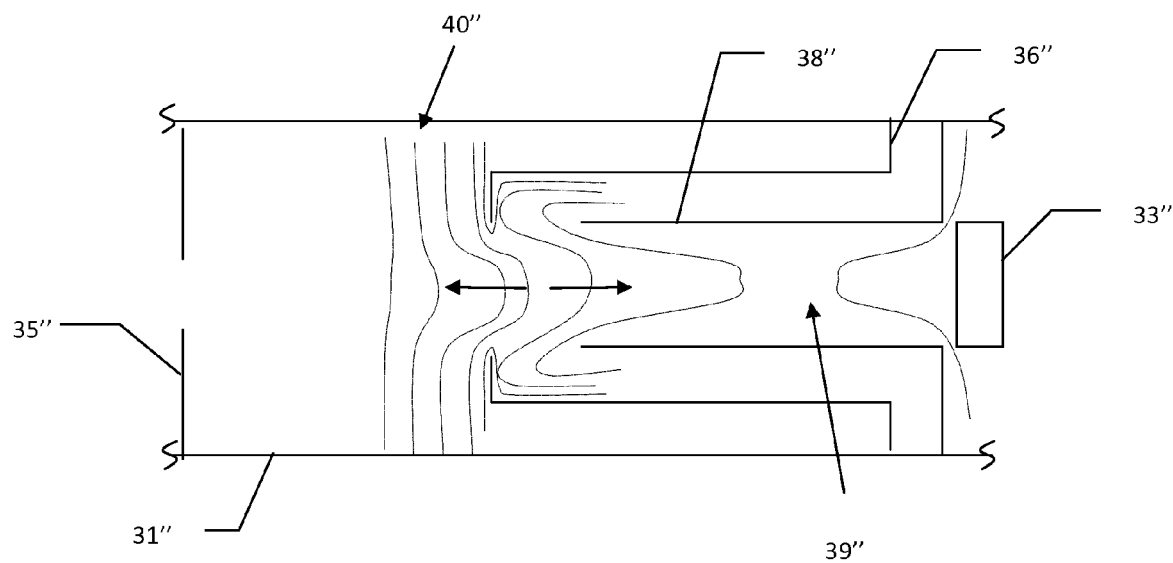
FIG. 4 is a schematic cross-sectional diagram of another embodiment of the radiation generator of FIG. 1 illustrating field regions caused by the suppressor electrode and target extender electrode thereof.

In the example embodiments illustrated in FIGS. 1 and 3, the target extender electrode 38, 38' has a tubular shape which extends from the stem 37 or target electrode 33', respectively, toward the ion generator 32, 32'. The target extender electrode 38, 38' may be attached to the stem 37 or the target electrode 33' by a suitable connection process such as soldering, brazing, welding, fastening, crimping, etc. In accordance with another example embodiment shown in FIG. 4, the target extender electrode 38" may be part of the vacuum envelop and coupled to the sidewall of the generator housing 31", similar to the suppressor electrode 36". As a result of these target extender configurations, electrons or low energy ions coming from a charge exchange reaction occurring in the region 39', 39" would be trapped by the suppressing field 40', 40", or would have less chance to escape due to the relatively small solid angle of the aperture between the target electrode 33" and the target extender electrode 38" in the embodiment of FIG. 4.

Where the target extender electrode 38, 38' is connected to the stem 37 or target electrode 33', the target extender electrode will share the same voltage or potential as the target and create the low field region noted above. If the target extender electrode 38" is not coupled to the target 33", as shown in FIG. 4, the voltage on the target extender electrode may be less than or equal to the voltage on the target electrode 33" and above the voltage of the suppressor electrode 36". In this configuration the target extender electrode 33" may conceptually be considered as a second suppressor. In any event, as a result of the biased extender, any electrons created in the low field region would be pushed towards the target electrode 33".

Figure 5:
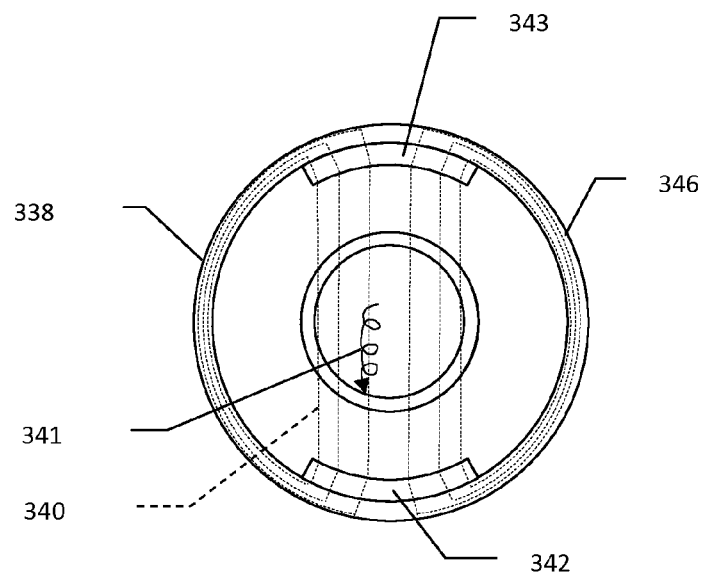
FIG. 5 is an end view of the suppressor electrode and the target extender electrode of an embodiment of the radiation generator of FIG. 1 in which the electrodes comprise a magnetic material.

Another example configuration is shown in FIG. 5, in which a target extender electrode 338 comprises a magnetic material (e.g., nickel, etc.). Magnetization of the target extender electrode 338 may be performed through the inclusion of magnets 342, 343 (e.g., "button" magnets) on opposite interior sides of the suppressor electrode 336, for example. This creates a magnetic suppression, as represented by field lines 340. Moreover, the suppressor electrode 336 may similarly comprise a magnetic material, which may help shield the acceleration gap from the magnetic field of the target extender electrode 338. With the target extender electrode 338 being magnetized, secondary particles will be directed transversally towards the sidewalls of the target extender electrode. With the suppressor electrode 336 also being made of a magnetic material (e.g., nickel, etc.), this provides the return path for the magnetic flux. An example trajectory of a secondary charged particle 341 is represented by the spiral arrow in FIG. 5. This helps reduce the negative effects these particles may otherwise have, such as a build up of space charge and "slower" particles finding their way to the entry aperture of the extender, for example.

Figure 6:
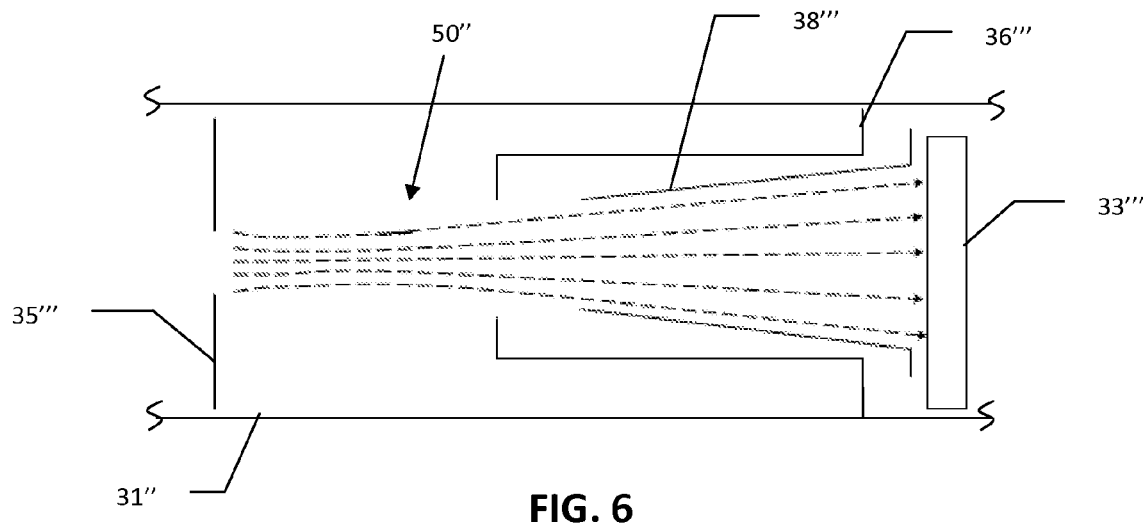
FIG. 6 is a schematic cross-sectional diagram of another embodiment of the radiation generator of FIG. 4 in which the target extender electrode has a tapered shape.

Another example embodiment of the target extender electrode 38''' is shown in FIG. 6. Here, the target extender electrode 38''' has a tapered tubular shape with a larger diameter end adjacent the target electrode 33''', and a smaller diameter end opposite the larger diameter end. The resulting low field region adjacent the target electrode 33''' allows for an expanding ion beam 50''', which may further help reduce the target temperature by utilizing a larger surface area for the active target region, and accordingly decreasing power density. That is, with a conventional construction such as that shown in FIG. 7, the ion beam has a relatively constrained defocusing effect. However, with the strength of the field within the target extender electrode 38''' being relatively low, the high energy ions continue on their path without disruption, which enlarges the diameter of the beam spot on the target surface, as shown.

Figure 8:
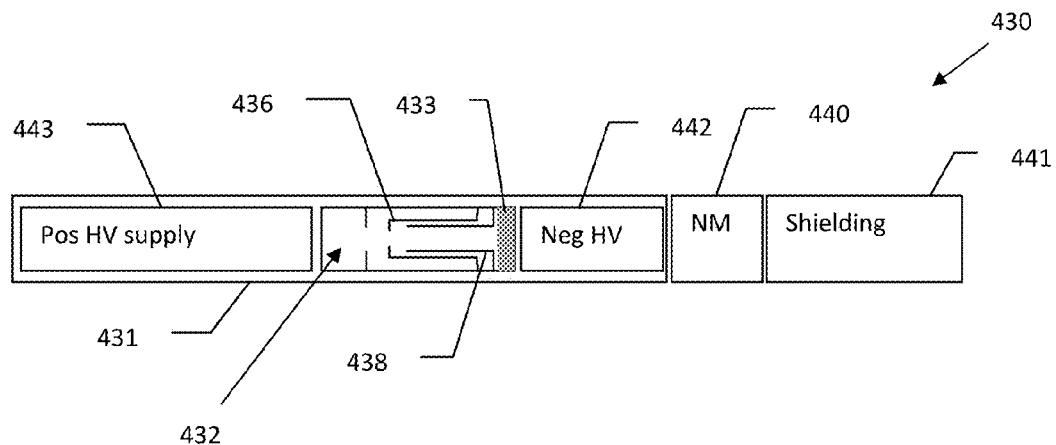
FIG. 8 is a schematic cross-sectional diagram of an example embodiment of the radiation generator of FIG. 1.

Since the use of a target extender electrode as described above allows for shorter targets (i.e., with shorter or no stems), this helps to provide more layout options when designing and manufacturing radiation generators for different applications. This may be further understood with reference to an example embodiment of a neutron generator 430 shown in FIG. 8. In the illustrated example, the neutron generator 430 includes a generator housing 431. An ion source 432 and associated extractor electrode 435, suppressor electrode 436, target extender electrode 438, target electrode 433 (with no stem or a shortened stem), negative HV supply 442, and a positive HV supply 443 are carried by the generator housing 431. Furthermore, a neutron monitor 440 and shielding 441, similar to those discussed above with reference to FIG. 7, are also coupled with the generator housing 431.

An additional advantage, when using an extender electrode which is not electrically shorted to the target electrode, is the possibility of having the target high voltage being the same as the suppressor electrode high voltage. Traditional designs use a target high voltage (absolute value), and therefore the accelerating potential is lower than the suppressor voltage to generate the suppressing electric field. The resulting loss in the high voltage potential (about 1 kV) may reduce the available neutron output at the same total voltage by about 3%, for example.

The shortened target electrode configuration allows for the illustrated "floating" ion source configuration with spare room to include the negative HV supply 442, and thus the ability to use a bi-polar voltage ladder configuration, for example. Moreover, this may be done without compromising the distance D1 from the target to the neutron monitor 440, or the distance D2 from the target to the shielding 441, which as described above with reference to FIG. 7 are parameters to be accounted for in the layout of the neutron generator 430. More particularly, with the layout of the neutron generator 430, the distances D1 and D2 may remain substantially similar to those in the prior configuration shown in FIG. 7.

The above-described configurations may help reduce the number of secondary particles created in the gap between the suppressor electrode and the target electrode, which would otherwise be slightly accelerated and have a negative effect in terms of ions sputtering material and electrons heating the cathode, for example. Moreover, use of a target extender electrode as described above may also help to reduce the temperature of the radiation generator target with respect to prior configurations (such as the one illustrated in FIG. 7) for the same power levels by reducing the length of path the heat has to take before it is evacuated. This may result in associated benefits, such as making the radiation generator more efficient, as the lower the target temperature the higher the density of hydrogen isotopes the target releases. Furthermore, for the same power level, the above-described radiation generators may be rated for higher temperature operation without having to modify the target configurations. In addition, this may also allow the radiation generator to be used at higher power without de-rating the operating temperature of the well logging tool. Also, the target extender configurations may help increase the high voltage insulation, which may increase the target temperature rise, to therefore allow operation at higher voltages and/or with increased reliability.

Figure 9:
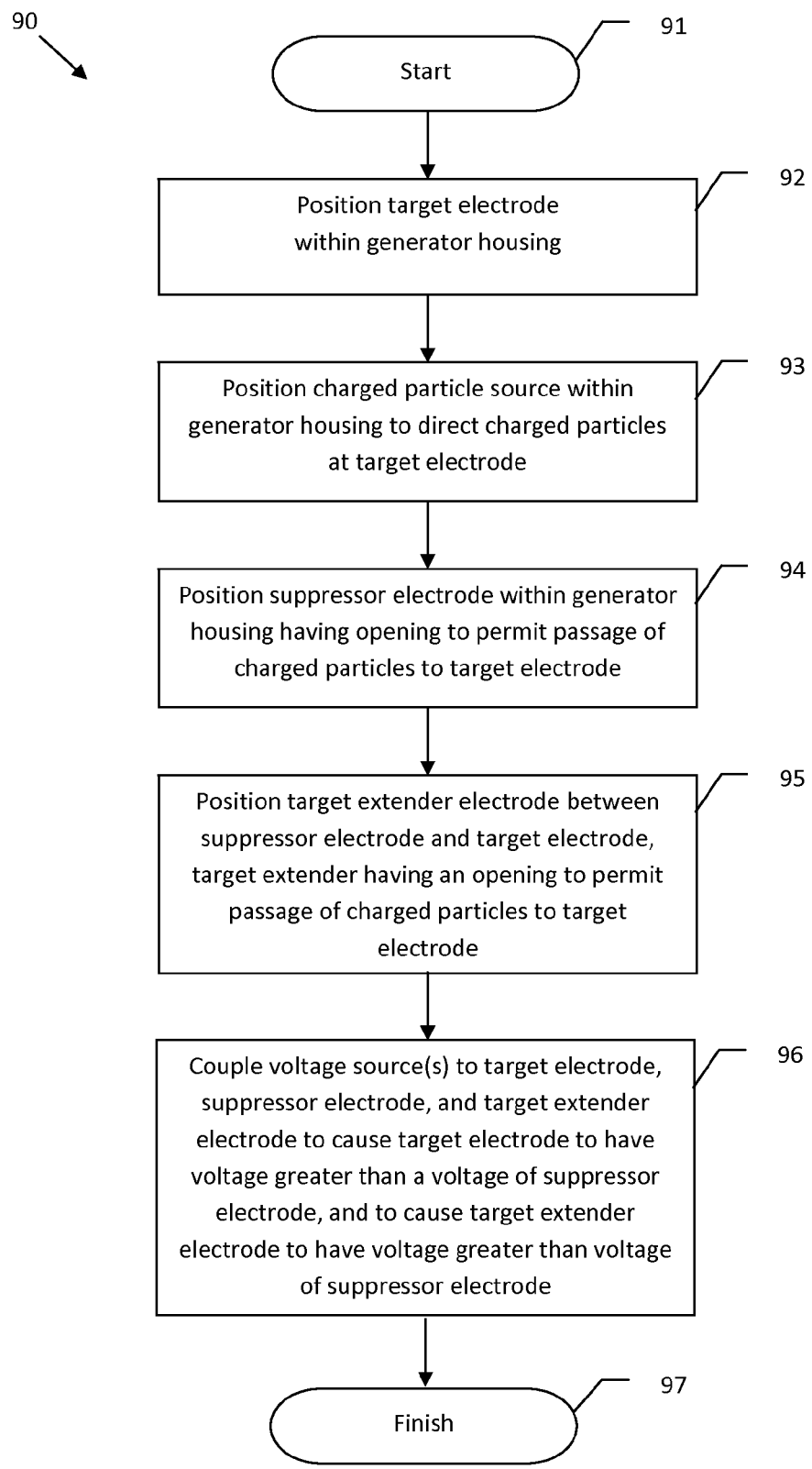
FIG. 9 is a flow diagram illustrating method aspects associated with making the radiation generators of the example embodiments.

A related method of making the radiation generator 30 (or other radiation generator configurations set forth herein) is now described with reference to the flow diagram 90 of FIG. 9. Beginning at Block 91, the method illustratively includes positioning the target electrode 33 within the generator housing 31, and positioning the charged particle (e.g., ion) source 32 within the generator housing to direct charged particles at the target electrode, at Blocks 92 and 93. The method may further include positioning the suppressor electrode 36 within the generator housing 31 having an opening therein to permit passage of charged particles to the target electrode 33, at Block 94, and positioning the target extender electrode 36 between the suppressor electrode and the target electrode, at Block 95. As noted above, the target extender electrode 33 has an opening therein to permit passage of charged particles to the target.

The method may further include coupling one or more voltage sources (e.g., the high voltage sources 442, 443 shown in FIG. 8) to the target electrode 33, the suppressor electrode 36, and the target extender electrode 38 to cause the target electrode to have a voltage greater than a voltage of the suppressor electrode, and to cause the target extender electrode to have a voltage greater than the voltage of the suppressor electrode, at Block 96, which concludes the illustrated method (Block 97). This provides the above-described suppression field, along with the low field region adjacent the target electrode 33'. It should be noted that the above-described operations may be performed in different orders in different embodiments.

Figure 10:
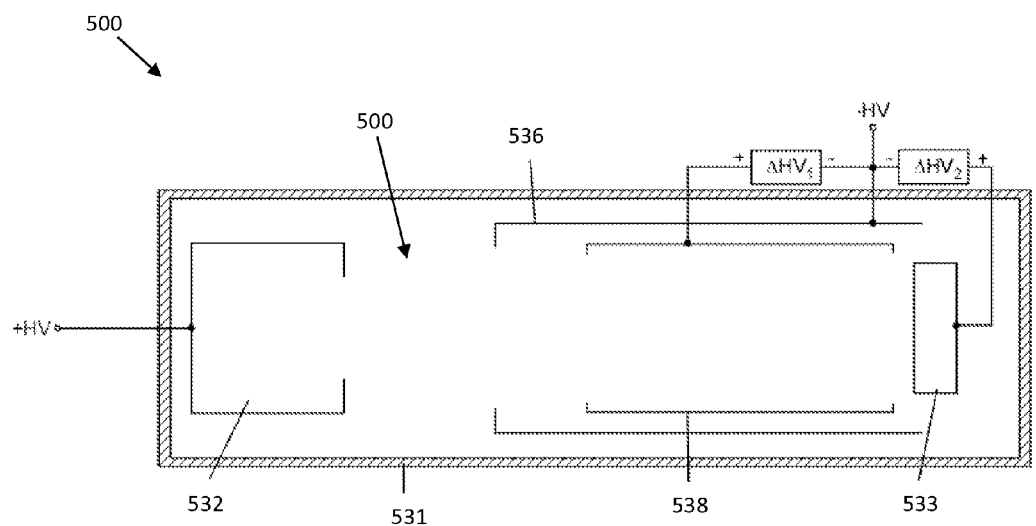
FIG. 10 is a schematic cross-sectional diagram of another embodiment of the radiation generator of FIG. 1.

With regard to the target electrode having a voltage greater than a voltage of the suppressor electrode, in the case of acceleration of positive ions, this may be further understood with reference to a neutron generator 500 shown in FIG. 10. The neutron generator 500 illustratively includes a housing 531, ion source 534, target 533, suppressor electrode 536, an accelerator gap 536 between the target and suppressor electrode, and an extender electrode 538 positioned within the suppressor electrode (which is not electrically shorted to the target), which are similar to those described above. The voltage is greater with reference to a negative high voltage value –HV, defining a voltage differential $\Delta HV_2$ between the target electrode 33" and the voltage –HV, and a voltage differential $\Delta HV_1$ between the target extender electrode 538 and the voltage –HV. In this configuration (i.e., with the target extender electrode 538 not electrically shorted to the target 533), the voltages of the suppressor electrode 536 and the target 533 may be the same.

While the above noted embodiments have been described in the context of a traditional sealed generator tube, it will be appreciated that these embodiments are equally applicable to generator tubes with a more complex electrode arrangement such as described in U.S. patent application Ser. No. 12/618, 821, which is also assigned to the present Assignee and is hereby incorporated herein in its entirety by reference.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A radiation generator comprising:
    a generator housing;
    a target electrode carried by said generator housing;
    a charged particle source carried by said generator housing to direct charged particles at said target electrode based upon an accelerating potential;
    a suppressor electrode carried by said generator housing having an opening therein to permit passage of charged particles to said target electrode;
    a target extender electrode between said suppressor electrode and said target electrode and having an opening therein to permit passage of charged particles to said target electrode; and
    at least one voltage source coupled to said target electrode, said suppressor electrode, and said target extender electrode to cause said target electrode to have a voltage greater than or equal to a voltage of said suppressor electrode and to cause said target extender electrode to have a voltage greater than the voltage of said suppressor electrode.

2. The radiation generator of claim 1 wherein said target extender electrode is coupled to said target electrode.

3. The radiation generator of claim 1 wherein said target extender electrode is coupled to said generator housing.

4. The radiation generator of claim 1 wherein said target extender electrode comprises a magnetic material.

5. The radiation generator of claim 1 wherein said suppressor electrode comprises a magnetic material.

6. The radiation generator of claim 1 wherein said at least one voltage source causes said target extender electrode and said target electrode to have a same voltage.

7. The radiation generator of claim 1 wherein said target extender electrode has a tubular shape.

8. The radiation generator of claim 1 wherein said target extender electrode has a tapered tubular shape with a larger diameter end adjacent said target electrode and a smaller diameter end opposite said larger diameter end.

9. The radiation generator of claim 1 wherein said charged particle generator comprises an ion stream generator.

10. A well logging tool comprising:
    a sonde housing;
    a radiation generator carried by said sonde housing and comprising
    a generator housing,
    a target electrode carried by said generator housing,
    a charged particle source carried by said generator housing to direct charged particles at said target electrode based upon an accelerating potential,
    a suppressor electrode carried by said generator housing having an opening therein to permit passage of charged particles to said target electrode,
    a target extender electrode between said suppressor electrode and said target electrode and having an opening therein to permit passage of charged particles to said target electrode, and
    at least one voltage source coupled to said target electrode, said suppressor electrode, and said target extender electrode to cause said target electrode to have a voltage greater than a voltage of said suppressor electrode and to cause said target extender electrode to have a voltage greater than the voltage of said suppressor electrode; and
    at least one radiation detector carried by said sonde housing.

11. The well logging tool of claim 10 wherein said target extender electrode is coupled to said target electrode.

12. The well logging tool of claim 10 wherein said target extender electrode is coupled to said generator housing.

13. The well logging tool of claim 10 wherein said target extender electrode comprises a magnetic material.

14. A method of making a radiation generator comprising:
positioning a target electrode within a generator housing;
positioning a charged particle source within the generator housing to direct charged particles at the target electrode based upon an accelerating potential;
positioning a suppressor electrode within the generator housing having an opening therein to permit passage of charged particles to the target;
positioning a target extender electrode between the suppressor electrode and the target electrode, the target extender having an opening therein to permit passage of charged particles to the target electrode; and
coupling at least one voltage source to the target electrode, the suppressor electrode, and the target extender electrode to cause the target electrode to have a voltage greater than a voltage of the suppressor electrode, and to cause the target extender electrode to have a voltage greater than the voltage of the suppressor electrode.

15. The method of claim 14 wherein positioning the target extender electrode further comprises coupling the target extender electrode to the target electrode.

16. The method of claim 14 wherein positioning the target extender electrode further comprises coupling the target extender electrode to the generator housing.

17. The method of claim 14 wherein the target extender electrode comprises at least one of an electrically conductive material and a magnetic material.

\* \* \* \* \*